May 22, 1934.    J. M. HARDESTY    1,959,421
CONDUIT JOINT
Original Filed Feb. 27, 1931
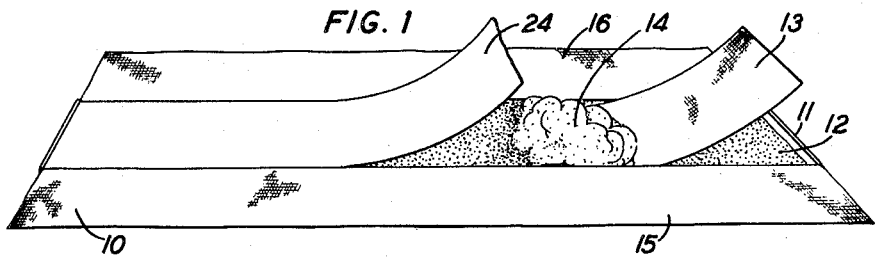
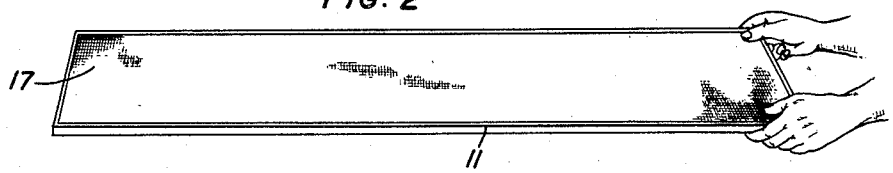
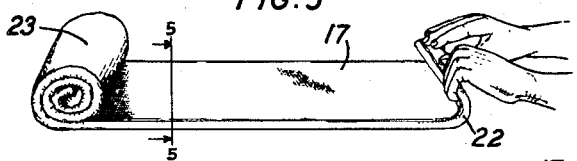
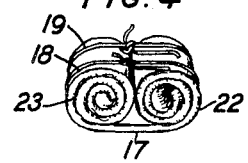
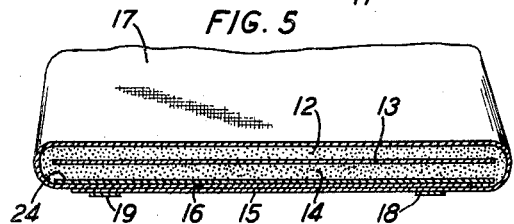
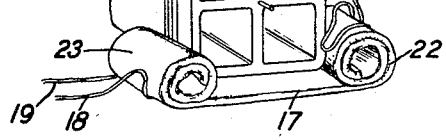
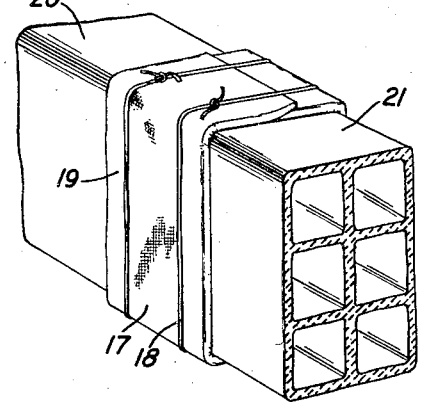
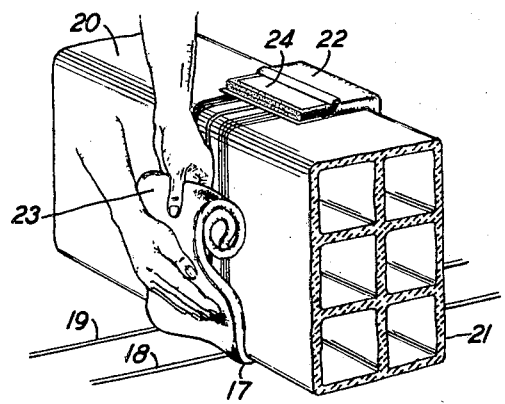
INVENTOR
J. M. HARDESTY
BY J. MacDonald
ATTORNEY Patented May 22, 1934

1,959,421

UNITED STATES PATENT OFFICE 1,959,421

CONDUIT JOINT

James M. Hardesty, East Orange, N. J., assignor to Bell Telephone Laboratories, Incorporated, New York, N. Y., a corporation of New York Continuation of application Serial No. 518,653, February 27, 1931. This application November 27, 1931, Serial No. 577,639

4 Claims. (Cl. 285—193)

This application is a continuation of the application of J. M. Hardesty, Serial No. 518,653, filed February 27, 1931.

This invention relates to joints in underground conduits and more particularly to a method of making such joints in clay conduits and the like by means of a wrapper or bandage which surrounds the joint and firmly holds the abutting ends of the conduit in place.

An object of the present invention is to provide a conduit joint which will not only be simple and inexpensive, but will be practically silt and water-tight.

Another object of the invention is to provide a better bond between the abutting ends of the conduit which are being joined.

A further object of the invention is to provide a joint which will be flexible for a short period of time after it has been made in order that small movements in the conduit band may be made.

Another object of the invention is the provision of a joint which is considerably stronger mechanically than the present type of joint.

Another object is to provide a means for making joints in conduits and the like which can be prepared beforehand and used down in the trench with a minimum amount of labor and inconvenience.

Another object of my invention is the provision of a means for making joints in conduits and the like, which is not difficult to handle and will retain the water inside of the bandage where it will be available for hardening the mortar after the joint is wrapped.

Another object of this invention is the provision of means in a mortar bandage of this type for preventing the mortar paste from flooding through to the outside of the bandage while at the same time allowing it to flood freely through to the tile surface.

Another object of the invention is the provision of a mortar bandage joint in which the cement mortar is plastic and kept so for a considerable length of time allowing it to be thoroughly worked in order to form a satisfactory joint.

In accordance with my invention, my improved conduit joint comprises a strip of cheesecloth or the like, of a length sufficient to surround the conduit to be joined and allow for a slight overlap. This strip of cloth is formed into an elongated envelope having on its interior a layer of cement mortar, a reenforcing strip of cloth and another layer of cement mortar. A strip of waterproof paper is then laid on the layer of cement mortar and the edges of the outer cheesecloth wrapper are folded over this. This cheesecloth envelope completely encloses the mortar and forms a wrapper or bandage of sufficient length to surround the conduit and of sufficient width to allow a substantial overlap on each side of the joint. This bandage or wrapper is placed around the joint and pressed firmly in place and it is then tied securely by means of tapes or the like which are secured on each side of the joint.

The method of making the wrapper or bandage and its application will be described in detail in the following description.

Fig. 1 shows the cheesecloth envelope for the mortar bandage positioned in a tray, the tray being partially filled with mortar and the reenforcing cheesecloth strip and waterproof paper being laid therein.

Fig. 2 illustrates the completed bandage in the tray and about to be removed by overturning the tray.

Fig. 3 shows the bandage being rolled so that it may be readily handled.

Fig. 4 shows the bandage completely rolled and tied together with tape.

Fig. 5 is a view in cross-section of the completed bandage taken at 5—5 of Fig. 3.

Fig. 6 shows the bandage positioned beneath the conduits to be joined.

Fig. 7 illustrates the method of applying the bandage to the abutting end of the conduit.

Fig. 8 illustrates the completed joint, the mortar bandage now being in place and held there by means of the tapes which are securely tied therearound.

Referring now to Fig. 1:

A strip of cheesecloth 10 equal to the length of the tray 11 and approximately three times as wide as the tray is positioned in the tray so that equal portions 15 and 16 of the cloth 10 extend over the sides of the tray 11. A sufficient quantity of mortar 12 is now placed in the tray on top of the cloth 10 so that when the mortar 12 is leveled the tray will be approximately half filled. A second strip of cheesecloth 13 cut to a length and width equalling that of the tray 11 is placed on top of the mortar 12 and smoothed down, this strip of cloth 13 acting as a reenforcement for the finished bandage by preventing the mortar in the bandage from slumping when it is placed around the conduit.

After the reenforcing strip 13 is placed in the tray 11 on top of the mortar 12, the next step is to place a quantity of mortar 14 on top of the strip 13 and smooth it out so as to entirely fill the tray 11. After the mortar 14 has been smoothed out, a strip of waterproof paper 24 is placed thereon in firm contact therewith. The overhanging portions 15 and 16 of the cloth 10 are then folded over the paper 24 and pressed into intimate contact therewith, as shown in Fig. 2. Fig. 2 illustrates the completed bandage 17 in the tray about to be removed by overturning the tray.

When the completed bandage 17 has been removed from the tray 11, it is loosely rolled up from both ends toward the middle as shown in Fig. 3. This method of rolling the bandage brings the bonding surface, that is, the single thickness of cloth, inside in order to protect it and also to insure, that when it is unrolled, it is properly positioned to receive the conduit.

Fig. 4 illustrates the completed bandage 17 rolled up and loosely tied by means of the tapes 18 and 19, these tapes being used later to secure the bandage around the conduit.

In making a joint between the abutting ends of conduits and the like, in accordance with my invention, I first untie the strings 18 and 19, and unroll the bandage 17 a sufficient amount to allow the conduit 20 to be placed thereon. The end of the conduit 20 is so placed on the bandage 17 that it overlaps the bandage approximately half the width of the bandage itself as shown in Fig. 6. The conduit 20 is now ready to receive the other section of conduit to which it is to be joined. The section 21 is now placed on the bandage 17 with its end bearing against the conduit 20. The conduits 20 and 21 are now in position on the bandage 17 and the operation of placing the bandage around the conduit and securing it thereto is ready to take place.

As shown in Fig. 7 the end 22 of the bandage 17 has been unrolled and placed in position around the conduits 20 and 21, the other end 23 being unrolled and brought into place. After the bandage has been placed around the conduit with its ends overlapping, any suitable means may be employed to smooth out the bandage and to force it in place, such, for example, as a smooth block of wood.

The tapes 18 and 19 are now drawn tightly around the bandage 17, one on each side of the joint and are securely tied in place as shown in Fig. 8. This figure illustrates the completed joint, which after the cement has hardened will form a strong durable joint which is practically silt and moistureproof.

Although any of the well known cement mortars will make a satisfactory bandage joint applicant has found that a mortar employing a certain amount of cement paste is desirable and he has found that a mortar having a mixture of 1-1½ of Portland cement and sand plus a small amount of diatomaceous earth, a very fine powder which holds a large amount of moisture, makes the mortar plastic and keeps it in this condition for some time. When the bandage is pressed into contact with the surface of the conduit this water is available for flooding the cement mortar paste through the cloth, even though the bandage has been made some time previous to its use.

The bandage as designed by the applicant is so constructed that it is not messy to handle and the water which is needed for the hardening of the mortar after the joint is wrapped remains on the inside. This was accomplished by putting a piece of stiff waterproof paper in the bandage so as to be on the outside of the bandage and just under the outer cheescloth cover, when the joint is wrapped and in position on the conduit.

It has been found that the paper keeps the mortar paste from flooding through to the outside of the bandage while at the same time allowing it to flood freely through to the tile surface of the conduit.

It is readily apparent that this method of making joints in conduits and the like, provides not only a joint which is economical to make, but one which requires less skill than the former type.

In making joints in accordance with this invention, the bandages are prepared on the surface of the ground adjacent the trench and are handed down to the man in the trench ready for application to the conduit.

While there is shown and described herein the preferred embodiment of the invention, it is understood that it is not limited or confined to the precise details of construction herein disclosed as modifications and variations may be made without departing from the spirit of the invention.

What is claimed is:

1. A wrapper or bandage for joining conduits and the like comprising a textile envelope, said envelope containing a cohesive material, a reenforcing strip of textile embedded in said cohesive material and a strip of moistureproof material between said cohesive material and said envelope.

2. A wrapper or bandage for joining conduits and the like comprising a textile envelope, said envelope containing a cohesive material, a reenforcing strip of textile embedded in said cohesive material and a strip of moistureproof material adjacent said reenforcing strip but separated therefrom by a layer of cohesive material.

3. A wrapper or bandage for joining conduits and the like comprising a textile envelope, said envelope being of a length sufficient to surround the conduits to be joined, granular cohesive material confined within the folds of said envelope, a reenforcing strip of textile material extending the full length of said envelope, said reenforcing strip being embedded in said material between the folds of the envelope and having cohesive material on each side thereof.

4. A wrapper or bandage for joining conduits and the like comprising a textile envelope, said envelope being of a length sufficient to surround the conduit to be joined, a cohesive material in said envelope, a reenforcing strip of textile material extending the full length of said envelope, said reenforcing strip being located in the center of said envelope and having a cohesive material on each side thereof, and a strip of moistureproof material on one side of said reenforcing strip having a layer of cohesive material therebetween.

JAMES M. HARDESTY.